(12) United States Patent
Beeston et al.

(10) Patent No.: US 11,068,188 B2
(45) Date of Patent: Jul. 20, 2021

(54) MONITORED MIGRATION OF COPIES OF VOLUMES OF DATA BETWEEN CLUSTERS OF A VIRTUAL TAPE LIBRARY SYSTEM

(71) Applicant: International Business Machines Corporation, Armonk, NY (US)

(72) Inventors: Ralph Thomas Beeston, Tucson, AZ (US); Mark A. Roche, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/576,480

(22) Filed: Sep. 19, 2019

(65) Prior Publication Data

US 2021/0089224 A1    Mar. 25, 2021

(51) Int. Cl.
*G06F 11/14* (2006.01)
*G06F 3/06* (2006.01)

(52) U.S. Cl.
CPC .......... *G06F 3/0647* (2013.01); *G06F 3/0614* (2013.01); *G06F 3/0644* (2013.01); *G06F 3/0653* (2013.01); *G06F 3/0659* (2013.01); *G06F 3/0664* (2013.01); *G06F 3/0686* (2013.01); *G06F 11/1456* (2013.01)

(58) Field of Classification Search
None
See application file for complete search history.

(56) References Cited

U.S. PATENT DOCUMENTS

| 8,225,057 B1 * | 7/2012 | Zheng ............... G06F 11/1458 |
| | | 711/162 |
| 8,261,033 B1 | 9/2012 | Slik et al. |
| 9,367,257 B2 | 6/2016 | Hamilton et al. |
| 9,990,147 B2 | 6/2018 | Sorenson, III et al. |

(Continued)

FOREIGN PATENT DOCUMENTS

| CN | 109460188 A | 3/2019 |
| WO | 201714809 A1 | 1/2017 |

OTHER PUBLICATIONS

IBM, "Syncronizing cluster copies in a TS7700 Grid (PRESTAGE and COPYRFSH)," IBM, Feb. 13, 2018, 2 pages, retrieved from ftp://ftp.software.ibm.com/storage/tapetool/Syncronizing_cluster_copies_in_TS7700.pdf.

(Continued)

*Primary Examiner* — Brian R Peugh
(74) *Attorney, Agent, or Firm* — Zilka-Kotab, P.C.

(57) ABSTRACT

In one general embodiment, a computer-implemented method includes querying a database associated with a first cluster of a virtual tape library system for volumes of data stored in the first cluster and querying a second database associated with a second cluster of the virtual tape library system for volumes of data stored in the second cluster. Results of the querying of the database associated with the first cluster are compared with results of the querying of the database associated with the second cluster. The method further includes generating a list of entries of volumes of data that are to be migrated from the first cluster to the second cluster based on the comparing of the results. The (Continued)

entries of the list are ordered according to predefined conditions. The method further includes migrating from the first cluster to the second cluster, copies of the volumes of data of the generated list.

20 Claims, 7 Drawing Sheets

(56) References Cited

U.S. PATENT DOCUMENTS

| | | | |
|---|---|---|---|
| 9,996,429 B1 * | 6/2018 | Kumar | G06F 11/1448 |
| 10,754,696 B1 * | 8/2020 | Chinnam | G06F 11/1464 |
| 2015/0220564 A1 * | 8/2015 | Goldberg | G06F 11/1453 |
| | | | 707/648 |
| 2018/0329647 A1 | 11/2018 | Dai et al. | |
| 2019/0250844 A1 * | 8/2019 | Kawamura | G06F 3/0649 |
| 2019/0339896 A1 * | 11/2019 | McCloskey | G06F 3/0647 |

OTHER PUBLICATIONS

Nohta, T., "IBM® TS7700 Series z/OS Host Command Line Request User's Guide Version 4.1.2," IBM Corporation, Jan. 2018, pp. 1-216.

* cited by examiner

US 11,068,188 B2

MONITORED MIGRATION OF COPIES OF VOLUMES OF DATA BETWEEN CLUSTERS OF A VIRTUAL TAPE LIBRARY SYSTEM

BACKGROUND

The present invention relates to data storage systems, and more specifically, this invention relates to data migration between clusters of a virtual tape library system.

Conventional data storage systems store data on one or more physical storage devices. Where data is stored across more than one device and/or non-sequentially, a customer is typically not presented with data in the organization in which the data is physically stored. Rather, data storage system interfaces present the customer with a virtual library in which the customer's data appears to be stored in the structure/organization in which the customer saved such data, e.g., such as according to file formatting.

In some cases, more than one instance of the same data is stored within the data storage system, e.g., such as for error recovery purposes. However, the customer might not know that multiple instances of data are stored on a data storage device, unless the customer intentionally stored multiple instances of the data.

SUMMARY

A computer-implemented method according to one embodiment includes querying a database associated with a first cluster of a virtual tape library system for volumes of data stored in the first cluster and querying a second database associated with a second cluster of the virtual tape library system for volumes of data stored in the second cluster. Results of the querying of the database associated with the first cluster are compared with results of the querying of the database associated with the second cluster. The method further includes generating a list of entries of volumes of data that are to be migrated from the first cluster to the second cluster based on the comparing of the results. The entries of the list are ordered according to predefined conditions. The method further includes migrating from the first cluster to the second cluster, copies of the volumes of data of the generated ordered list. The migrating is performed according to the order of the list. Moreover, an extent of concurrent migration of volumes of the generated ordered list is based on an adjustable threshold of a queue. The adjustable threshold of the queue is decreased in response to determining that overhead of the virtual tape library system exceeds a first predetermined threshold, and the adjustable threshold of the queue is increased in response to determining that the overhead of the virtual tape library system is below a second predetermined threshold.

A computer program product for monitored migration of copies of volumes of data between clusters of a virtual tape library system according to one embodiment includes a computer readable storage medium having program instructions embodied therewith. The program instructions are readable and/or executable by a controller to cause the controller to perform the foregoing method.

A system according to one embodiment includes a processor and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
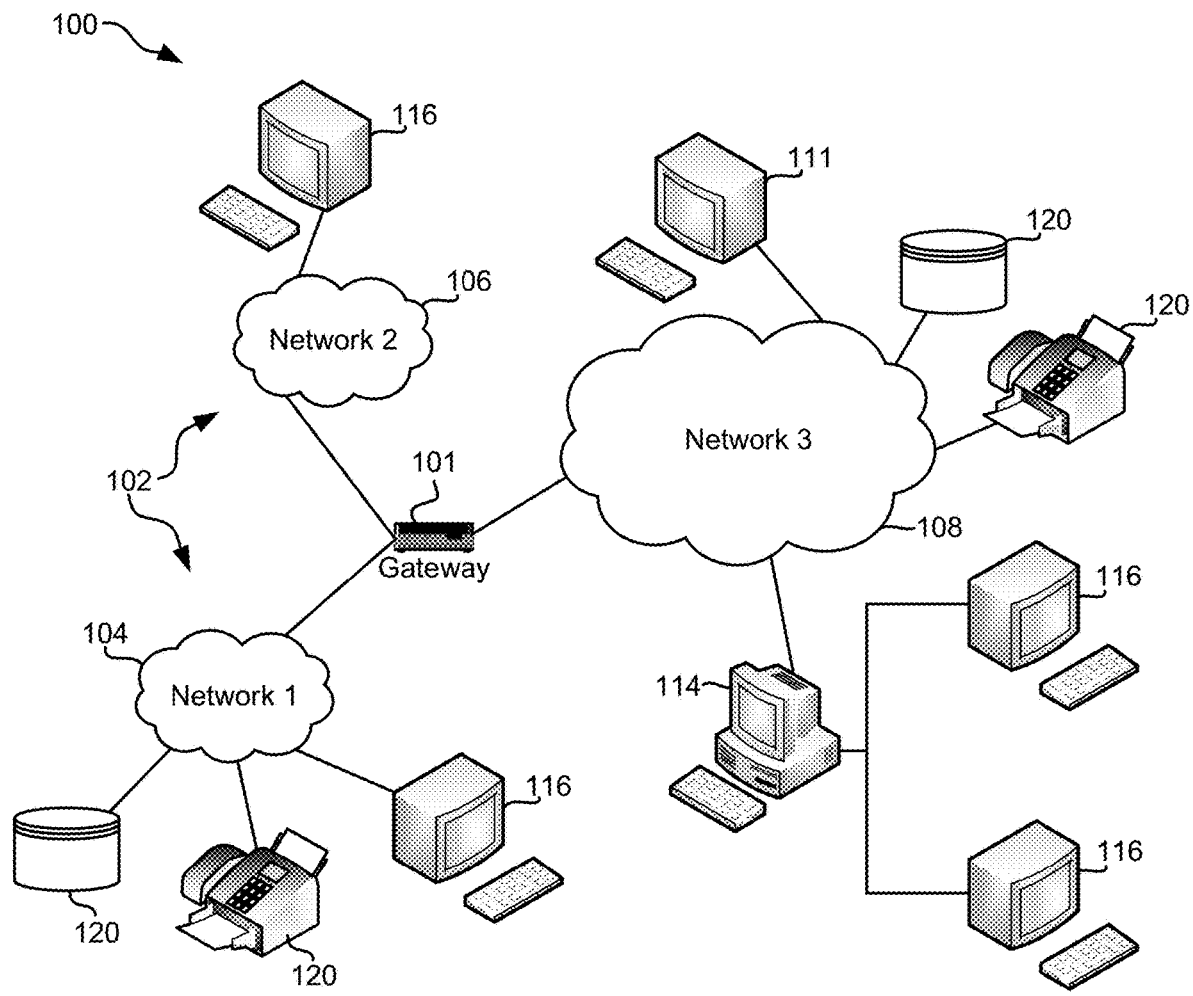
FIG. 1 is a network architecture, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for monitored migration of copies of volumes of data between clusters of a virtual tape library system.

In one general embodiment, a computer-implemented method includes querying a database associated with a first cluster of a virtual tape library system for volumes of data stored in the first cluster and querying a second database associated with a second cluster of the virtual tape library system for volumes of data stored in the second cluster. Results of the querying of the database associated with the first cluster are compared with results of the querying of the database associated with the second cluster. The method further includes generating a list of entries of volumes of data that are to be migrated from the first cluster to the second cluster based on the comparing of the results. The entries of the list are ordered according to predefined conditions. The method further includes migrating from the first cluster to the second cluster, copies of the volumes of data of the generated ordered list. The migrating is performed according to the order of the list. Moreover, an extent of concurrent migration of volumes of the generated ordered list is based on an adjustable threshold of a queue. The adjustable threshold of the queue is decreased in response to determining that overhead of the virtual tape library system exceeds a first predetermined threshold, and the adjustable threshold of the queue is increased in response to determining that the overhead of the virtual tape library system is below a second predetermined threshold.

In another general embodiment, a computer program product for monitored migration of copies of volumes of data between clusters of a virtual tape library system includes a computer readable storage medium having program instructions embodied therewith. The program instructions are readable and/or executable by a controller to cause the controller to perform the foregoing method.

In another general embodiment, a system includes a processor and logic integrated with the processor, executable by the processor, or integrated with and executable by the processor. The logic is configured to perform the foregoing method.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment, a UNIX® system which virtually hosts a Microsoft® Windows® environment, a Microsoft® Windows® system which emulates an IBM® z/OS® environment, etc. This virtualization and/or emulation may be enhanced through the use of VMware® software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
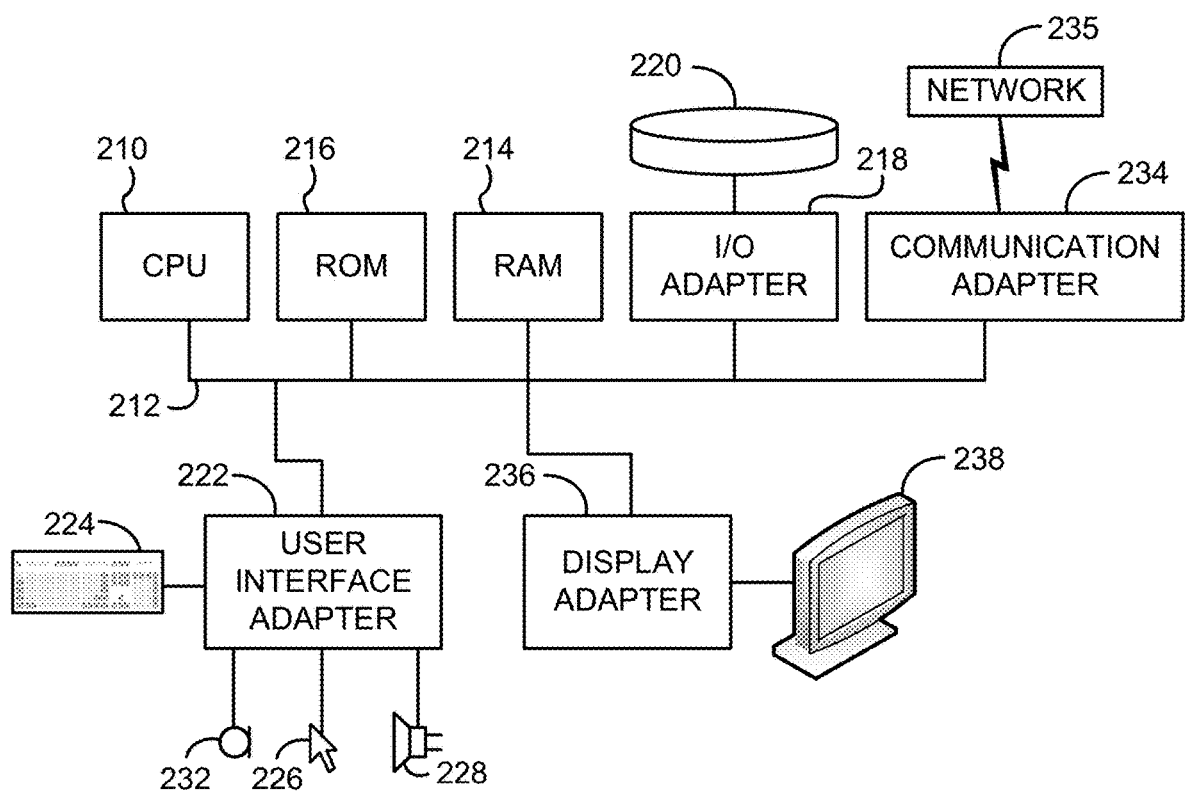
FIG. 2 is a representative hardware environment that may be associated with the servers and/or clients of FIG. 1, in accordance with one embodiment of the present invention.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
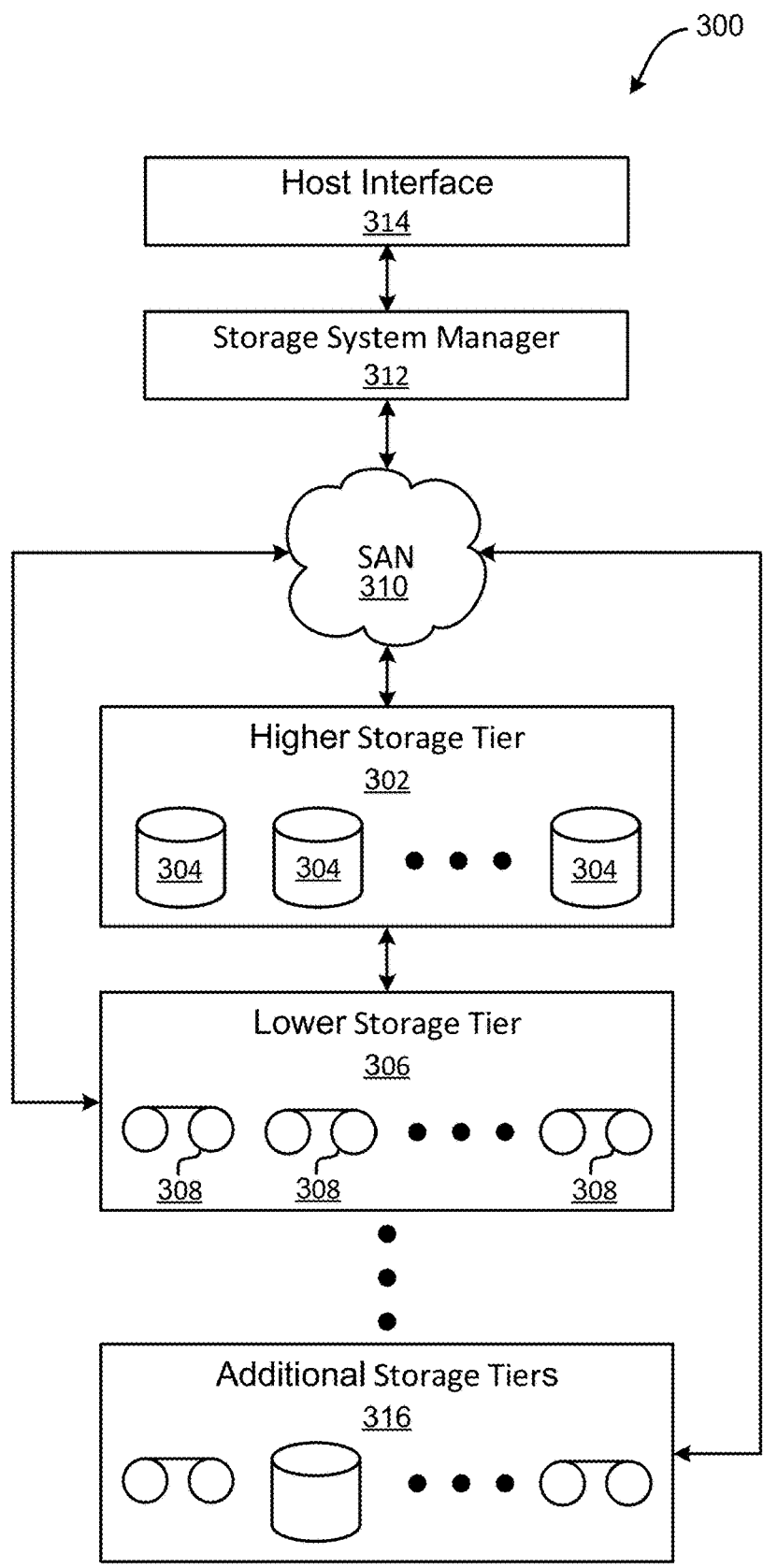
FIG. 3 is a tiered data storage system in accordance with one embodiment of the present invention.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As previously mentioned elsewhere above, conventional data storage systems store data on one or more physical storage devices. Where data is stored across more than one device and/or non-sequentially, a customer is typically not presented with data in the organization in which the data is physically stored. Rather, data storage system interfaces present the customer with a virtual library in which the customer's data appears to be stored in the structure/organization in which the customer saved such data, e.g., such as according to file formatting.

In some cases, more than one instance of the same data is stored within the data storage system, e.g., such as for error recovery purposes. However, the customer might not know that multiple instances of data are stored on a data storage device, unless the customer intentionally stored multiple instances of the data.

As will be described in several embodiments and approaches elsewhere herein, one or more virtual data systems may include a virtual tape server. The virtual tape server may include one or more virtual tape libraries, each having one or more clusters. However, the host is preferably only presented with a single tape library (which may in fact be a combination of more than one tape library). For example, the TS7700 by IBM® (which may be purchased from IBM North America, 590 Madison Avenue, New York, N.Y. 10022, United States) for "z Systems" is a storage system that includes one or more clusters, and up to eight clusters per library, all presented to the host of the same tape library. For reference, a cluster may be a predefined unit of storage space on a storage device, typically a smallest amount of storage space that a file can be stored on.

In virtual tape server systems, a cluster may in some approaches include any one or more of, e.g., attachment interfaces, virtual tape devices, a virtual tape library of volumes (typically common to all clusters), storage for virtual volumes, optional attachment(s) to tiered storage, etc. Tiered storage, such as for cloud and/or tape based data storage, is optional and may be used for moving volumes to or from local storage to the tiered storage for purposes of efficiency within the data storage system. A host of the virtual tape server may optionally mount any logical volume on any cluster and access that volume in the library regardless of which cluster(s) have a copy of that volume stored locally.

In some approaches herein, a set of clusters that present themselves as one library to a host may be referred to as a "grid." However, these clusters may be geographically dispersed. The grid manages serialization of access to all volumes from any logical device in the grid and selects which cluster to access data from for optimizing performance.

A user may define/configure routines in the host which selects a policy name for the data that it writes to the grid. Such policy names may be passed to the grid when a volume is mounted. Moreover, the user may configure the behavior of the grid for each of such defined policy names. For context, according to some approaches, such policies may define one or more of, e.g., which cluster(s) are used as the storage point(s) for the volume, when the volume is to be copied to other cluster(s), etc.

In some approaches, policies may be user specific, e.g., based on the personal/unique preferences of the user. For example, a user may have use for multiple redundant copies of an instance of data on multiple clusters in the grid. Moreover, the user may additionally and/or alternatively request that two synchronous copies of the data be made at creation with other copies created asynchronously at a later time. This request may provide users with have a highly available system that is also capable of recovering from a disaster which may, as a result of the disaster, result in one or more clusters in the grid being inaccessible.

Over time there may arise a reason for geographically relocating, adding, removing, or updating clusters within the grid. Various embodiments and approaches described herein include redistribution of data within a single grid of a data storage system. Specifically, several embodiments and approaches described herein include monitored migration of copies of volumes of data between clusters of a virtual tape library system.

It should be prefaced that although it is mentioned elsewhere above that various embodiments and/or approaches described herein may be applied to for virtual tape library systems, such as those configured with a TS7700 storage system, such embodiments and approaches are not intended to be limited thereto, and may be applied to any type of data storage system.

Figure 4:
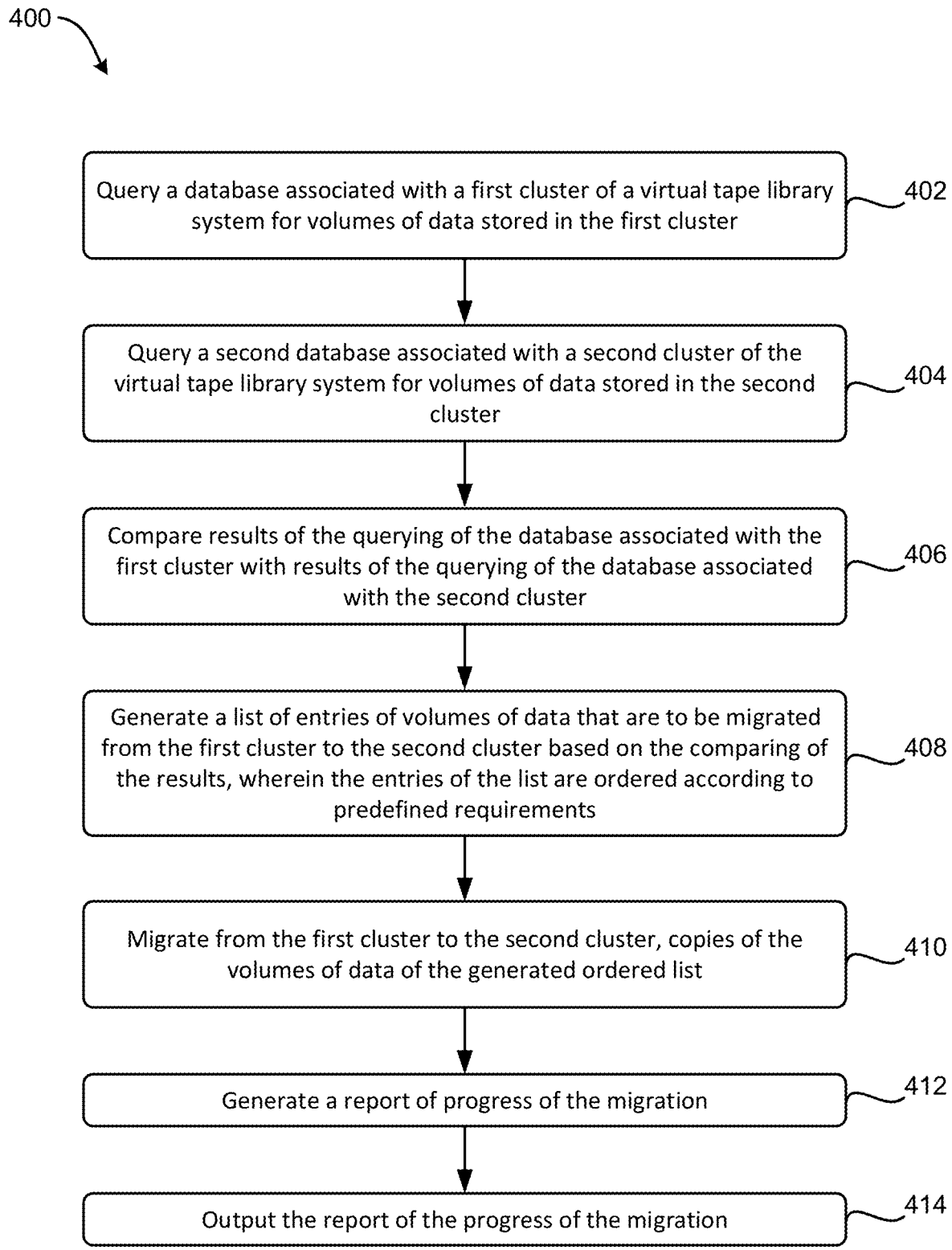
FIG. 4 is a flowchart of a method, in accordance with one embodiment.

Now referring to FIG. 4, a flowchart of a method 400 is shown according to one embodiment. The method 400 may be performed in accordance with the present invention in any of the environments depicted in FIGS. 1-3, 5A-5C and 6A-6B. among others, in various embodiments. Of course, more or fewer operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a controller, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

Operation 402 of method 400 includes querying a database associated with a first cluster of a virtual tape library system for volumes of data stored in the first cluster. Similarly, a second database associated with a second cluster of the virtual tape library system may be queried for volumes of data stored in the second cluster, e.g., see operation 404 of method 400.

The virtual tape library system may include any number of clusters, each of which may have a database associated therewith. For reference, a cluster may be a predefined unit of storage space on a storage device, typically a smallest amount of storage space that a file can be stored on. In the present approach, the virtual tape library system is described to include a first cluster and a second cluster. In one preferred approach, the virtual tape library system may include up to eight clusters.

The querying of the database associated with the first cluster and the database associated with the second cluster may in some approaches be performed to determine a version of and/or contents of data stored on the databases. As will become apparent upon reading the descriptions herein, in some approaches, the version and/or contents of data stored on the databases may be determined in order to further determine what data is to be migrated between clusters. For example, as will be described in some approaches elsewhere herein, the first cluster may serve as a source for migrated data, and the second cluster may serve as a potential target for receiving copies of volumes of data from the first cluster.

In some approaches, a scope of the querying of the database associated with the first cluster and/or the querying of the second database associated with the second cluster may be narrowed. For example, according to a more specific approach, volumes of data of the database associated with the second cluster that match predefined user criteria may be excluded from the querying of the database associated with the second cluster. Such predefined user criteria for narrowing the scope of the querying may include any type of criteria, e.g., management class characteristics, physical volume ranges, file names, volume storage sizes, age of data, etc. Narrowing the scope of the querying may reduce the overall querying time of operation 402 and/or operation 404.

In some approaches, the querying of the database associated with the first cluster of the virtual tape library system and/or the querying of the database associated with the second cluster of the virtual tape library system may include performing more than one querying of the respective database. In some approaches in which a querying of a respective database is performed more than one time, one or more of the iterations of the querying may include a unique search criterion. Moreover, a subsequent iteration of querying a respective database may be performed in response to one or more amendments being made to the respective database since a previous querying. In such approaches results of each of the queries may be incorporated into a comparison of the queries, e.g., see operation 406.

The results of the querying of the database associated with the first cluster are compared with the results of the querying of the database associated with the second cluster, e.g., see operation 406 of method 400. According to various approaches, the comparing of the results may be performed using one or more known types of comparisons. In some approaches, the comparing may reveal the differences between the volumes of data stored in the first cluster and the volumes of data stored in the second cluster, e.g., the difference(s) in versions of the volumes of data stored in the clusters, the difference(s) in the storage size of one or more volumes of data stored in the first cluster and the storage size of one or more volumes of data stored in the second cluster, the difference(s) in a predefined number of files stored in one or more volumes of data stored in the first cluster and a predefined number of files stored in one or more volumes of data stored in the second cluster, etc.

Operation 408 of method 400 includes generating a list of entries of volumes of data that are to be migrated from the first cluster to the second cluster based on the comparing of the results. As will be described below, a primary end goal of the generating the ordered list of entries may be to prepare a structured text file that is filtered and sorted, so that the volumes of the ordered list may be migrated to the second cluster, e.g., see operation 410.

According to various approaches, the volumes of data that are to be migrated from the first cluster to the second cluster based on the comparing of the results may be based on any one or more predefined criterium which may be predefined by, e.g., received customer inputs, a default set of criteria, a table of criterium that applies different criterium based on the type of data being stored in the one or more of the databases of the virtual tape library system, etc.

According to some more specific approaches, the predefined one or more criterium may specify characteristics of one or more volumes of data that if present in the comparing of the results, causes entries corresponding to the volumes of data to be added to the list of entries. For example, in one approach, the predefined criterium may specify that volumes of data that are to be migrated to the second cluster include a predetermined amount of data that is not present in one or more volumes of data stored in the second cluster. In another example, the predefined criterium may specify that an entry be added to the list for a volume of data that has been updated on the first cluster provided that the update was not also applied to a copy of such data stored in the second cluster. In yet another approach, the predefined criterium may specify that a volume of data stored in the first cluster that is to be added as an entry to the list of entries includes a predetermined amount of data that has been corrupted/ experienced error in a volume of data stored in the second cluster, e.g., to enable repair/recovery of the data stored in the second cluster.

In some approaches, the entries of the list are ordered according to predefined conditions. The predefined conditions may include any type of conditions, which may be based on, e.g., customer requirements, system constraints, the size of the copies of data that are to be migrated, etc. In some approaches, the predefined conditions may be set for, and may be unique to each use of method 400. Moreover, the entries in the list may be additionally and/or alternatively ordered according to determined priority scores assigned to each entry within the list. Various approaches detailing predefined conditions and priority scoring applied to the ordered list will now be described below for purposes of non-limiting examples.

According to one approach, predefined conditions used for ordering the list of entries may be based on whether data of a given volume of data is scheduled to be overwritten on the database associated with the first cluster. In such an approach, the predefined conditions may be set such that in response a determination that data of the given volume of data is scheduled to be overwritten, the given volume of data may be assigned a higher priority score within the ordered list than a volume of data stored in the first cluster that is not scheduled to be overwritten. As a result of assigning a higher migration priority score within the ordered list to the given volume of data that is scheduled to be overwritten, the pending overwriting of the data will not be delayed for a duration longer than might otherwise occur if the given volume were assigned a lower priority score in the ordered list.

In another approach, predefined conditions used for ordering the list of entries may additionally and/or alternatively be based on a frequency of use of the data that is to be migrated. In other words, in such an approach, volumes having data that has previously been requested relatively more frequently may be assigned a higher priority score within the ordered list than data that has previously been requested relatively less frequently.

According to yet another approach, predefined conditions used for ordering the list of entries may additionally and/or alternatively be based on a number of copies of the volume of data that exist in the virtual tape library system. In such an approach, the predefined conditions may be set such that volumes containing a sole instance data (data that does not exist elsewhere in the virtual tape library system) are assigned a higher priority score within the ordered list than volumes containing instances of data that also exist elsewhere in the virtual tape library system. Such an approach may ensure that instances of data are preserved, e.g., not lost as a result of volumes on the first cluster experiencing error losses, by prioritizing migration of instances of data that exist only once within the virtual tape library system.

A resulting overhead of the virtual tape library system may in some approaches be considered for the generating the ordered list. The overhead consideration may be incorporated in the generating of the ordered list in order to prevent the migration process of method 400 from reducing the performance of the virtual tape library system beyond a predefined degree, e.g., such as determined by a threshold. For example, in some approaches, generating the ordered list of entries includes determining whether a given volume that is to be migrated from the first cluster to the second cluster would, as a result of queuing the entire given volume in the queue, cause the overhead of the virtual tape library system to exceed the predetermined threshold. The predetermined threshold may be measured against any one or more performance parameters of the virtual tape library system, e.g., throughput, write speed, read speed, response times, etc. In response to a determination that, as a result of queuing the entire given volume in the queue, the overhead of the virtual tape library system would exceed the predetermined threshold, the given volume may be logically partitioning into two or more portions, and a different entry may be created in the list for each of the portions of the given volume. One or more of the multiple entries of the partitioned volume may in some approaches not be sequentially ordered in the ordered list. In other approaches, the multiple entries of the partitioned volume may be sequentially ordered in the ordered list.

In response to a determination that, as a result of queuing the entire given volume in the queue, the overhead of the virtual tape library system would not exceed the predetermined threshold, the given volume may not be logically partitioning into portions, and the given volume may be associated with a single entry in the queue.

The predefined conditions optionally used in generating the ordered list may be received by a service provider from a customer that is using the virtual tape library system. Accordingly, in some approaches, the setting of predefined conditions and/or scoring priority scoring rules may include a service provider working directly with the customer in formulating such filters used to generate the ordered list. Of course, the predefined conditions/scoring priority scoring rules and/or resulting orderings may be reviewed with the customer before proceeding with migrations of copies of volumes of data, e.g., see operation 410.

As previously mentioned elsewhere above, in some approaches, multiple iterations of querying a respective database may be performed. In such approaches, where the order of the list of entries is already generated prior to performing a subsequent querying of a respective database, the order of the list may be reevaluated using the results of a comparison of the queries that incorporates the querying performed subsequent the generating the list of entries. In other words, the querying iterations performed after generation of the list of entries may be appended to a comparison and the ordered list may be reevaluated/reorganized.

It should be noted that it is expected that the data of the volumes used for generating the ordered list is available in a grid of the virtual tape library system. In some approaches however, there may be some use cases in which a customer may provide at least some information from another source.

In some approaches, generating the ordered list of entries may additionally and/or alternatively include generating an output file which may be used by a service provider of the virtual tape library system for effectuating filtering and sorting of data of the volumes according to the, e.g., predefined conditions, customer define criteria, etc. In some approaches, the data that is migrated may be obtained by direct access to the database associated with the first cluster of the virtual tape library system managed by the grid. A structured text output file may be used by the service provider for the filtering and sorting. The generated ordered list and/or pacing of the scheduled migration may be reviewed by a customer subsequent to the ordered list being generated and prior to copies of volumes of data of the generated ordered list being migrated.

Operation 410 of method 400 includes migrating from the first cluster to the second cluster, copies of the volumes of data of the generated ordered list. The migrating is preferably performed according to the order of the list, however, in some approaches, the order in which the migrating is performed may be amended at any time for any reason, e.g., such as in response to receiving an instruction for modifying the order of the migrating from a customer and/or administrator of the virtual tape library system.

A system on which the migrating is being performed is in some preferred approaches monitored during the entire migration process. A rate at which migration tasks are added to the system to be processed is paced such that when the system is busy, as defined by some workload threshold being reached and/or approached, additionally work is not added to the system for migration until the system become relatively less busy, e.g., as determined by a falling below a lower threshold and/or the workload threshold. Depending on the approach, there may be any number of workload activities that may be monitored during the migration process, e.g., how busy the host systems workload is on the subsystem, how many current migration tasks are already being processed, migrated data that needs to be moved out to another tier of storage to make room for more migrated data to be received by the cluster as other potential workloads, etc. As a result of monitors such subsystem conditions and controlling the rate of migration includes preventing a primary end goal of the storage subsystem from being impacted. According to one approach, some primary end goals of the storage subsystem include giving priority to host-based work and data replication on new host data, as well as responding in a relatively timely manner to received requests for retrieving data in the storage grid.

As indicated above, migration of the volumes of data of the generated ordered list may in some approaches include concurrent migration of volumes of the generated ordered list. Concurrent migration may result in a relatively quicker migration process than otherwise sequentially migrating each of the volumes of data of the generated ordered list. According to some more specific approaches, an extent of concurrent migration of volumes of the generated ordered list may be based on an adjustable threshold of a queue. In order to maintain performance of the virtual tape library system during the migrating, the adjustable threshold of the queue may be ongoingly adjusted in accordance with the overhead of the virtual tape library system. According to various approaches, the current overhead may be evaluated using any one or more known overhead metrics.

In one approach, the adjustable threshold of the queue may be decreased in response to determining that overhead of the virtual tape library system exceeds a first predetermined threshold. As a result of decreasing the adjustable threshold of the queue, a pace of initiating volumes of the ordered list may be reduced which in turn likely will result in the overhead of the system being also reduced. Note that the initial pace of initiating volumes of the ordered list may be set, e.g., according to a customer preference, by an administrator, according to a predetermined default standard, etc. The first predetermined threshold may be set such that the extent of concurrent migration is maximized while customers and/or administrators of the virtual tape library system do not experience a noticeable reduction in performance during use of the virtual tape library system. As will be described elsewhere herein, in some approaches, the migration may be postponed until the virtual tape library system is offline (scheduled to not be used by a customer for at least a predetermined amount of time). In one approach, while the tape library system is offline (scheduled to not be used by a customer for at least a predetermined amount of time), the first predetermined threshold may be increased to an extent which might otherwise cause customers and/or administrators of the virtual tape library system to experience a noticeable reduction in performance during use of the virtual tape library system, e.g., a loss of performance of the virtual tape library system, a resulting non-functional option of a customer interface of the virtual tape library system, a stalling of the virtual tape library system, etc.

In contrast, the adjustable threshold of the queue may be increased in response to determining that the overhead of the virtual tape library system is below a second predetermined threshold. The second predetermined threshold is preferably less than the first predetermined threshold, and according to one approach may be increased in response to a determination that a predetermined amount of performance resources of the virtual tape library system have gone unused for a predetermined amount of time. The predetermined amount of performance resources and/or the predetermined amount of time of such an approach may be increased in response to a determination that the overhead of the virtual tape library system exceeds the first predetermined threshold. Moreover, a workload of the virtual tape library system is also reduced as a result of not initiating migration of all the entries of the ordered list at the same time, but rather maintaining the queue. This is because the virtual tape library system does not have to breakdown migration tasks into smaller tasks and/or initiate migration tasks of copies of data that are large enough to stress the system capabilities. Moreover, the adjustable size of the queue ensures that an extensive batch of migration tasks is not initiated that would otherwise result in extensive downtime of the virtual tape library system during the migration, where backing out of the migration process is not an option.

The migration may in some approaches be a multi-staged process. For example, customer requirements used for generating the ordered list may include preferences such as migrating volumes in a specific category first, and then reviewing status of migration before performing a subsequent migration of data of a next entry in the ordered list. A migration of millions of volumes may take weeks to perform and during that migration one or more given volumes that are scheduled to be migrated may, subsequent starting the migration process but prior to the migration being performed on the given volume(s), be scratched, e.g., no longer need to be migrated. However, even thought it may be determined that the volume is no longer a migration candidate, the ordered list likely may, in some approaches, not be automatically amended to not include the scratched volume. Accordingly, in some approaches, method 400 may optionally include generating a new ordered list, e.g., refreshing the ordered list, periodically in order to determine a more accurate progress of the migration. Moreover, generating a new ordered list and/or refreshing the ordered list may allow for an accounting for attrition due to volumes being scratched, and also reduce time in the migration as copies of volumes that are no longer migration candidates will be excluded from the migration prior to migration being performed on such candidates.

In some approaches, the migration of copies of the volumes of data of the generated ordered list from the first cluster to the second cluster may be controlled by someone and/or a controller with access to do so, e.g., a customer, an administrator, a third party, etc., via a received command. For example, in one approach the migration may be initiated in response to receiving a command to do so. Once initiated, according to one approach, the migration may be run on a cluster of the virtual tape library system having management class, e.g., copy policies, that are to be used for the copy refresh. It should be noted that each cluster may include a definition of a copy policy of the virtual tape library system as viewed by that cluster, which may be unique to every cluster in the grid. Moreover, each volume may have a management class assigned thereto, e.g., assigned by the host, which may serve as a token used to look up the copy policy on the target cluster (second cluster in the present embodiment) for each volume.

According to another example, controlling the migration of copies of the volume may additionally and/or alternatively include stopping the migration. For example, during a copy refresh or migration process, the process be stopped in response to receiving a request to do so. In one approach, stopping the process may include terminating the migration task. Depending on the approach, a noting of the position in the volume list may be the responsibility of the service provider. Thereafter in response to receiving a command from the customer to restart the task, the volume list may be modified and reused.

Controlling the migration of copies of the volume may additionally and/or alternatively include pausing the migration for a period of time. For example, in response to receiving a command from a service provider to pause the migration, the migration may be paused. The command may be received as a manually invoked pausing of the migration process, which may thereafter be followed by a manual resume. In some preferred approaches, a position of the volume list at the time of the pause may be maintained, and in response to thereafter receiving a request from a customer to resume the process, the service provider may resume the task at the maintained position of the volume list.

According to another approach, controlling the migration of copies of the volume may additionally and/or alternatively include adjusting a pace of the migration by only queuing a limited number of migrations or copy refresh tasks at one time. In some approaches, only a limited number of migrations or copy refresh tasks may be placed in the queue for processing by the grid, while other migrations or copy refresh tasks may be assigned to be performed as a background task, e.g., to replace the tasks that were limited in response to receiving the pace limiting request from the customer. In another approach, example, a pace of the migration may be adjusted by increasing or decreasing the extent of concurrent migration of volumes of the ordered list in response to receiving a request to increase or decrease the pace of the migration.

In yet another example of controlling the migration of copies of the volume, a set window time for each day may be established, e.g., received from a customer as a request, within which no operations of method 400 are to occur. In some approaches, the period of time in which the migration is quiesced is during a peak periods of system usage. In response to receiving such a request, the background task may be controlled according to stop and start times. Upon reaching a respective one of such times, the background task may be automatically paused and thereafter resumed.

According to some approaches, a report of progress of the migration may be generated, e.g., see operation 412 of method 400. The report may be based on monitoring of the migration, and may include any known parameters/statistics of data migration, e.g., status indicators of active volumes in the migration queue, a number of copies of volumes that are still to be migrated, a number of copies of volumes that have been successfully migrated, etc. Generation of the report may be performed automatically and/or in response to any one or more events occurring, e.g., generated for every migration of copies of volumes of data, generated in response to the migration completing, generated at predetermined intervals, generated in response to receiving a user request, generated in response to the migration being paused/stopped/started, generated in response to the pace of the migration being adjusted, etc. According to another approach, the report may be generated in response to an adjustment of the threshold of the queue being performed, where the report may include a notice detailing an adjustment to the size of the adjustable threshold of the queue.

Operation 414 of method 400 includes outputting the report of the progress of the migration. The report may be output to any one or more locations, e.g., to storage, to a customer, to a display, etc.

The time for the migration process to be completed may depend on a plurality of factors, e.g., the size of the ordered list, a workload of the grid performing customer jobs, limits placed by customer(s) on pacing the migration, etc. During this process, a service provider may disconnect from the grid and return later to reconnect and monitor the migration progress, which may be reported to the customer in the generated report. However, because the service provider may elect to not maintain a connection to the grid for at least a partial duration of the process, in some approaches, the service provider automatically connects to the grid in response to receiving a request from the user for status information of the migration.

Although method 400 may be applied to any virtual tape library system, as mentioned elsewhere above, in one illustrative embodiment, method 400 may be implemented on a grid of a TS7700 storage system. The method may be performed by and/or managed by a service provider who has access to the TS7700 grid. The access may include a restricted service access to a menu and/or an unrestricted command line access.

Unrestricted access to the command line is preferably kept very limited. Such a limitation is maintained in order to prevent accidental or malicious damage to the grid by ensuring only properly trained, authorized, and monitored access to the grid. In one approach, a directory access protocol may be established to block external access to the grid. Specifically, in such an approach, the protocol may allow only predetermined users at one or more predetermined time periods, access to the grid. It is anticipated that more service provides may be used to perform this function than currently have the unrestricted access. Accordingly, a controlled access may be utilized for selectively implementing the present method to more individuals without granting a higher level of access than they are otherwise allowed.

In one approach, an interface for initiating method 400 on a virtual tape library system may be incorporated into an existing limited access service menu of the TS7700 storage system grid. As a result, users may be able to initiate the process without having to have the same degree of training and experience that may otherwise be a prerequisite for the unrestricted access.

More specifically, method 400 may be integrated with the TS7700 concurrently. In one approach, such integration may be achieved using a VTD_EXEC method. This method calls for a DVD to be placed in a cluster in the TS7700 grid and then service access to run the VTD_EXEC, or the VTD_EXEC may be copied to a system console of the virtual tape library system and pushed to the cluster. In another approach, such integration may be performed by simply copying code used for performing method 400, however this may require unrestricted command line access.

According to one illustrative approach which is in no way intended to limit the description herein, once integrated with the TS7700, many of the user preferences/requirements described elsewhere above may be obtained using the TS7700 Management Interface. For example, according to a more specific approach, such user preferences/requirements may be received from a customer as a command, e.g., a LIB REQUEST command, which may be issued by the customer and the z/OS system console specific to a cluster in the grid.

With continued reference to method 400, as a result of migrating from the first cluster to the second cluster, copies of the volumes of data of the generated ordered list, the organization/structure of the virtual tape library system may be modified, e.g., see FIGS. 5A-6B.

Figure 5B:
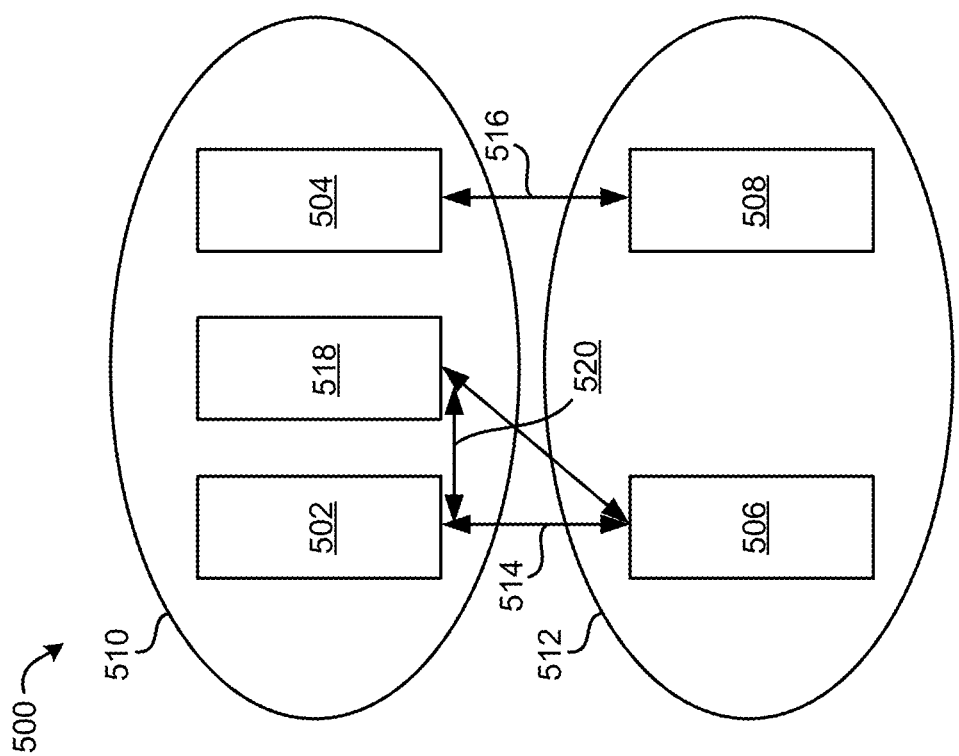
FIG. 5B is the grid of the virtual tape library system of FIG. 5A.
Figure 5A:
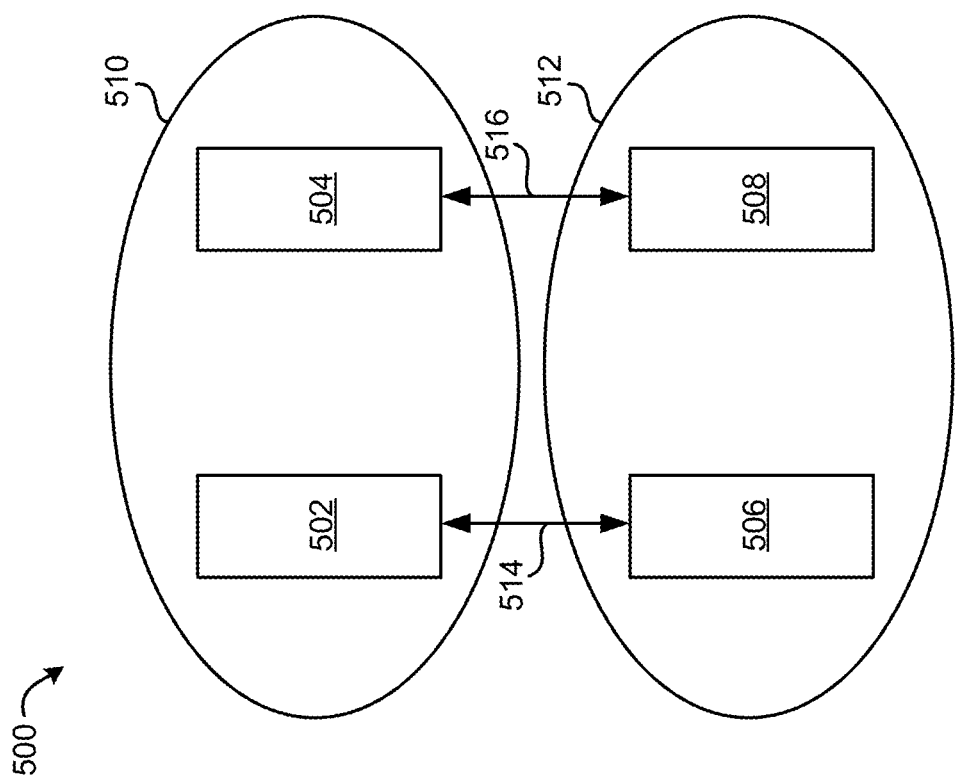
FIG. 5A is a grid of a virtual tape library system having two sites, in accordance with one embodiment.
Figure 5C:
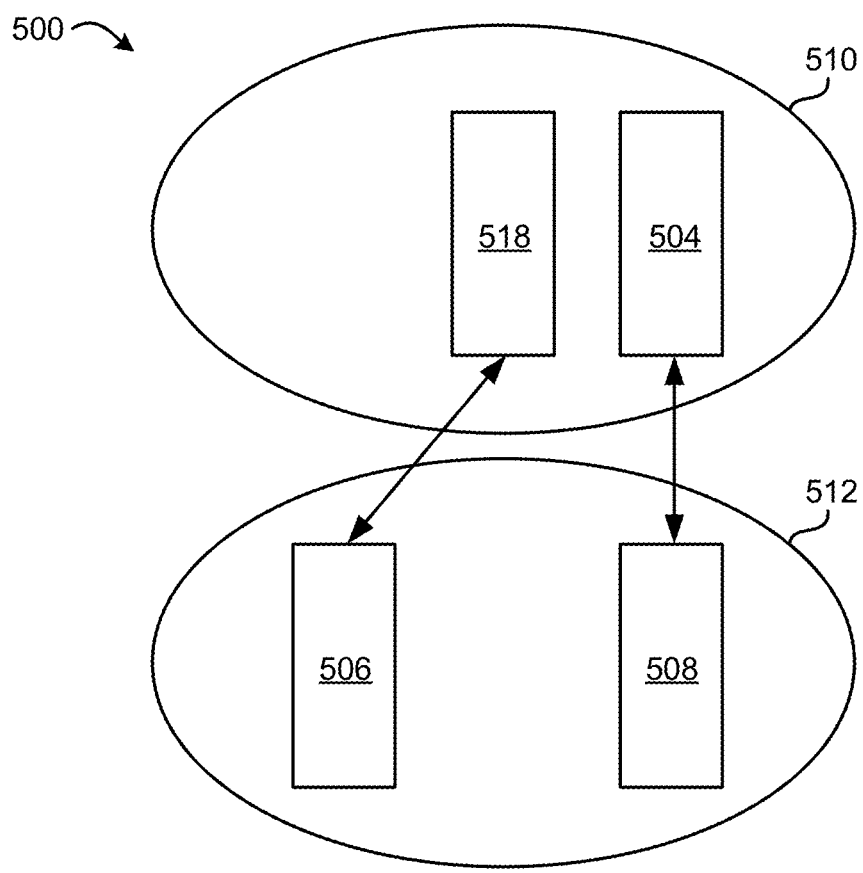
FIG. 5C is the grid of the virtual tape library system of FIGS. 5A-5B.

FIGS. 5A-5C depict a grid 500 of a virtual tape library system, in accordance with one embodiment. As an option, the present grid 500 may be implemented in conjunction with features from any other embodiment listed herein, such as those described with reference to the other FIGS. Of course, however, such grid 500 and others presented herein may be used in various applications and/or in permutations which may or may not be specifically described in the illustrative embodiments listed herein. Further, the grid 500 presented herein may be used in any desired environment.

As will be described in further detail below, in some approaches, the migration of various embodiments and approaches described herein may result in a logical replacement of one or more clusters of a virtual tape library system with one or more other clusters. For example, in the two cluster embodiment of method 400, the first cluster may be logically replaced with the second cluster in the virtual tape library system in response to migrating copies of the volumes from the first cluster to the second cluster. In contrast, in the illustrative embodiment of FIGS. 5A-5C, a migration results in the logical replacement one of the clusters in the production site with a new model and migration of data to that new model from the previous one.

With continued reference to FIGS. 5A-5C, the grid 500 includes four clusters: a first cluster 502, a second cluster 504, a third cluster 506, and a fourth cluster 508. As will be described elsewhere below, the grid 500 in FIG. 5B additionally includes a fifth cluster 518. According to one approach which is in no way intended to limit the description herein, the grid 500 may be a disk only solutions, i.e., no cloud or tape tier attached. More specifically, in the current embodiment, the first and second clusters 502, 504 are configured within the grid 500 for production purposes, e.g., see production site 510, and moreover the third and fourth clusters 506, 508 are configured within the grid 500 for disaster recovery purposes, e.g., see disaster recovery site 512.

Referring first to FIG. 5A, the third and fourth clusters 506, 508 of the disaster recovery site 512 are configured to receive, e.g., see data transfer illustrations 514, 516, data from a respective one of the first and second clusters 502, 504, of the production site 510. A management class set on the first and third clusters 502, 506 may be applied to deferred copies of data exchanged between such clusters, and moreover a management class set on the second and fourth clusters 504, 508 may be applied to deferred copies of data exchanged between such clusters. In the present approach the management classes are applied for replacing the first cluster 502 with a new model.

It may be assumed that in the present embodiment there are two copies of data. Specifically, the first copy of data exists in either of the clusters 502, 504 of the production site 510, while the second copy of data exists in either of the clusters 506, 508 of the disaster recovery site 512. In some approaches, the data may be balanced between each of the clusters at the respective sites 510, 512.

In FIG. 5A the grid 500 illustrates a state prior to migration being performed. Referring now to FIG. 5B, the grid 500 is illustrated in the process of the migration. The migration in the present approach is preferably concurrent with maintained full redundancy.

In response to the fifth cluster 518 being added, the grid 500 becomes a five cluster grid. The fifth cluster 518 may be connected to the production site 510 and/or a host of the grid 500, and all new mounts are directed to occur between the second cluster 506 and the fifth cluster 518. In approaches where the grid 500 is implemented as a grid of a TS7700 storage system, subsequent the connection of the fifth cluster 518, FICON interfaces may optionally be removed to the first cluster 502.

With continued reference to FIG. 5B, in order to copy data from the first cluster 502 to the fifth cluster 518, querying may be performed on databases associated with the first and fifth clusters 502, 518. Moreover, migration requirements, such as those received from a customer, may be established. For example, assuming that the grid 500 is implemented as a grid of a TS7700 storage system, in response to receiving customer requirements for the migration process, a Management Class policy may be created on the fifth cluster 518 similar to that which already existed on the first cluster 502, now including the first, third and fifth clusters 502, 506, 518.

The results of the querying of the databases associated with the first and fifth clusters 502, 518, may be compared. Based on the comparing of the results, a list of entries of volumes of data that are to be migrated from the first cluster 502 to the fifth cluster 518 may be generated. According to a more specific approach, the generated list may include all private volumes that exist in the database associated with the first cluster 502 that do not have a copy in the fifth cluster 518. Provided that such volumes of data satisfy predefined policies as defined on the fifth cluster 518 and/or within the grid 500, the volumes may be added as entries in the generated list. As previously described elsewhere above, the entries may be ordered within the generated list according to predefined conditions.

Copies of the volumes of data of the generated ordered list may be migrated from the first cluster 502 to the fifth cluster 518, e.g., see illustration 520. The migration may be monitored, and reports detailing a status up to and until the process is complete may be generated and output.

Subsequent migrating the copies of the volumes of data, in one approach it is verified that the first cluster 502 does not include volumes that are only contained on the first cluster 502. In response to a determination that the first cluster 502 does not include a sole copy of an instance of data, the first cluster 502 may be unjoined from the grid 500.

In some approaches that are specific to the TS7700, the Management Class policy may be changed to remove the first cluster 502 from copy modes.

Referring now to FIG. 5C, at the conclusion of the migration, the grid 500 includes the second and fifth clusters 504, 518 in the production site 510, and the third and fourth clusters 506, 508 in the disaster recovery site 512. Moreover, as a result of the migration, despite the unjoining of the first cluster 502 from the grid 500, the grid 500 contains the same data in the same configurations based on the fifth cluster 518 swapping out the first cluster 502.

It should be noted that in some approaches, where more than one instance of data that is scheduled to be migrated to a cluster exists in several different clusters, a grid function which performs the migration process, e.g., see method 400, may incorporate knowledge about the proximity of clusters, "families," when determining which cluster to source the copies from. For example, in FIG. 5B of the current embodiment, the first, second and fifth clusters 502, 504, 518 are in a first family and the third and fourth clusters 506, 508 are in a second family. However, in the present approach, the family associations may be created subsequent the fifth cluster 518 being added to the grid 500.

Figure 6A:
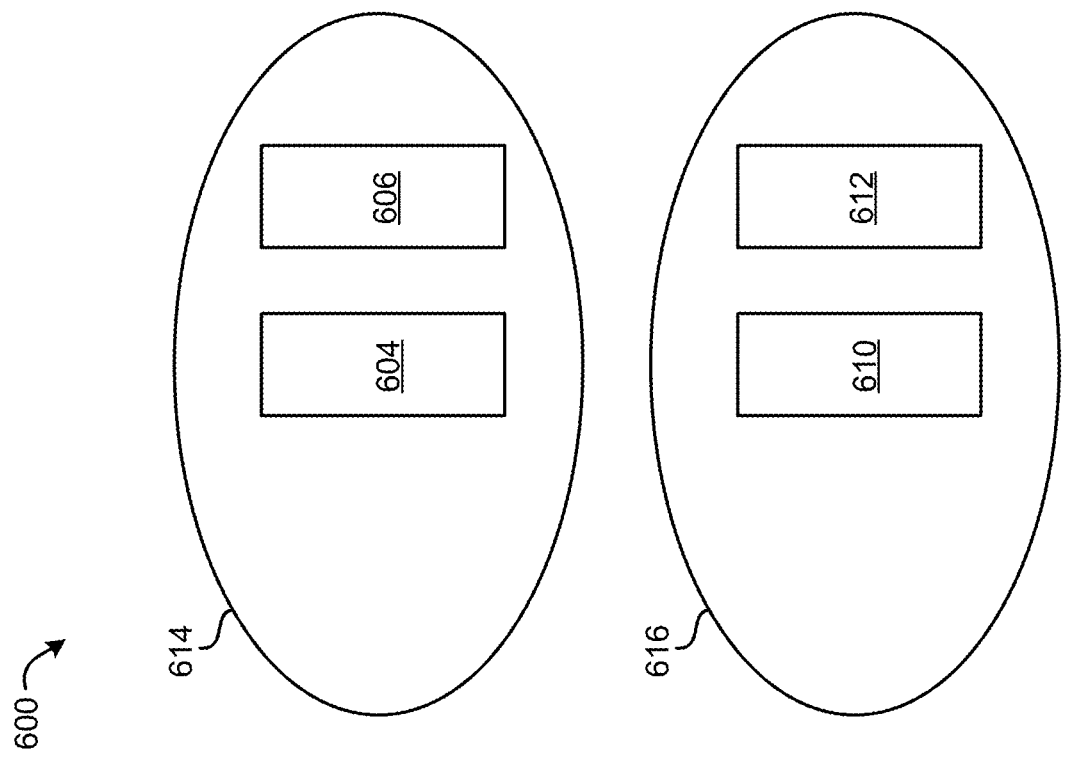
FIG. 6A is a grid of a virtual tape library system having two sites, in accordance with one embodiment.
Figure 6B:
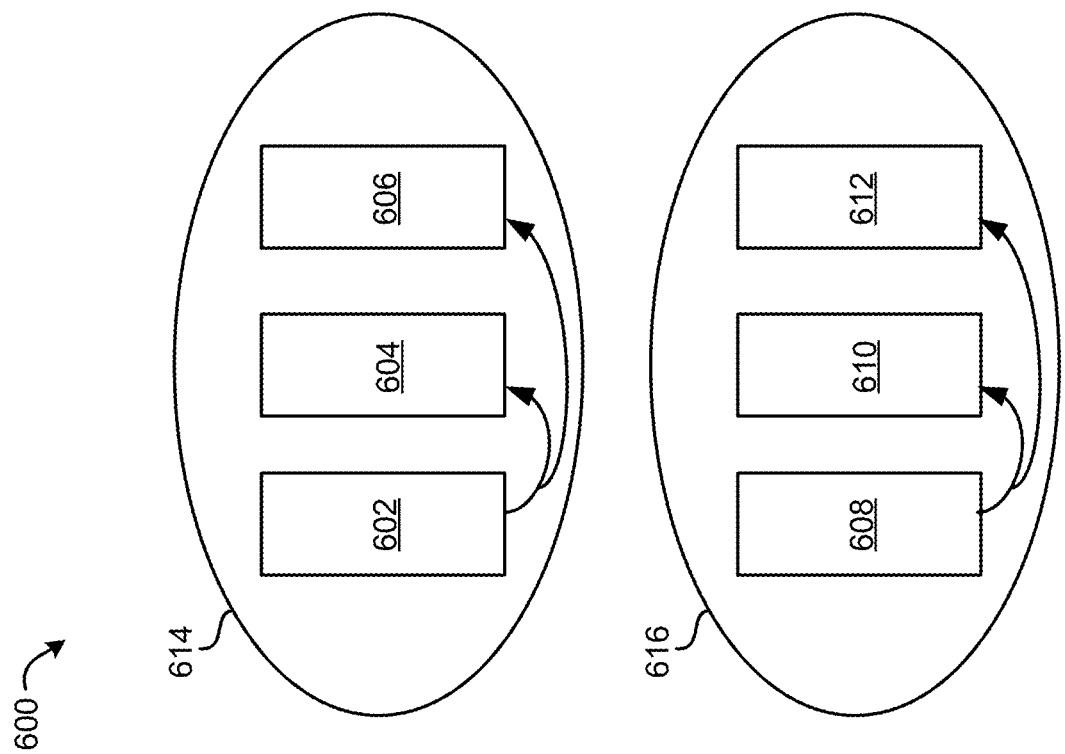
FIG. 6B is the grid of the virtual tape library system of FIG. 6A.

FIGS. 6A-6B depict a grid 600 of a virtual tape library system, in accordance with one embodiment. As an option, the present grid 600 may be implemented in conjunction with features from any other embodiment listed herein, such as those described with reference to the other FIGS. Of course, however, such grid 600 and others presented herein may be used in various applications and/or in permutations which may or may not be specifically described in the illustrative embodiments listed herein. Further, the grid 600 presented herein may be used in any desired environment.

Another use case for operations of method 400 may involve reducing the number of clusters in the grid as a result of the migration. More specifically, according to another embodiment, the migration may additionally and/or alternatively result in a logical decoupling of one or more clusters of a virtual tape library system with one or more other clusters. For example, in the two cluster embodiment of method 400, the first cluster may be logically decoupled from the virtual tape library system in response to migrating the copies of the volumes from the first cluster to the second cluster.

FIGS. 6A-6B, includes an illustrative example, that contrasts a prior model of grid 600, e.g., see FIG. 6A, which includes relatively more clusters to meet performance and/or capacity requirements than a newer model of the grid 600, e.g., see FIG. 6B, which includes relatively less performance and/or capacity needs. In some approaches, the reduction of clusters may be allowed based on improvements in performance capability or capacity limits of the newer models of the grid 600. This results in hardware associated with the virtual tape library system being reduced, which may preserve processing resources of the virtual tape library system.

Referring first to FIG. 6A, the grid 600 includes three clusters 602, 604, 606 at a first site 614, and three clusters 608, 610, 612 at a second site 616. In order to reduce the grid 600 from a three by three configuration of clusters to a two by two configuration of clusters, techniques described elsewhere herein for performing migration may be utilized for migrating copies of the volumes of data of databases associated with the clusters that are to be logically decoupled from the grid 600 to databases associated with clusters that are to remain logically coupled to the grid 600. For example, with joint reference now to FIGS. 6A-6B, the cluster 602 may be logically decoupled from the grid 600 in response to migrating the copies of the volumes of data from the cluster 602 to the clusters 604, 606. Moreover, the cluster 608 may be logically decoupled from the grid 600 in response to migrating the copies of the volumes of data from the cluster 608 to the clusters 610, 612. In one approach, logical decoupling of clusters in a grid may be useful in cases where storage requirements of a customer of the virtual tape library system no longer call for such extensive amounts of storage space. In such a case the logical decoupling is enabled by migrating data to a less extensive configuration of storage hardware, e.g., a reduced number of clusters.

In the present approach, the migration of each cluster that is to be logically decoupled, e.g., clusters 602, 608, may include evenly splitting the data that is migrated to the respective two remaining clusters, e.g., clusters 604, 606, 610, 612, at each site 614, 616. Specifically, in order to generate a list of entries of volumes of data that are to be migrated from the clusters that are to be logically decoupled to the remaining clusters, the volumes of data may be sorted by age, and split, alternating the target of each copy of the volume of data to a different one of the remaining clusters. In the current approach, because there are two sites 614, 616, within the grid 600, this process results in the production of two ordered lists of entries that may be run (used in a migration process) on two different clusters. This balancing of data migration to different remaining clusters may allow each remaining cluster to have an equal amount of data by age.

In some preferred approaches, migration may be concurrently performed according to orderings of the two generated lists of entries, on two different clusters in the same grid at a time, provided that such concurrent migration does not exceed pacing/queue requirements as described elsewhere herein. In such approaches, each migration process may make copy refresh requests to a different cluster. Note that provided that the policies on each of the clusters receiving the copies of data are exclusive of the other cluster also receiving copies of data, doubling copy requests to any one cluster would be avoided. Moreover, the migration may additionally and/or alternatively be performed where there is a common cluster in the list of entries. For example, migration may include queuing the copy refresh requests from more than one source at a time.

It should be noted that although the case use examples of FIGS. 5A-6C include condensing a grid of a virtual tape library system, in other approaches the migration techniques described herein, e.g., see method 400, may be used to expand grids of virtual tape library systems, e.g., such as for increasing the number of copies of data in a virtual tape library system and/or diversifying the location within a virtual tape library system at which a given instances of data is stored.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    querying a database associated with a first cluster of a virtual tape library system for volumes of data stored in the first cluster;
    querying a second database associated with a second cluster of the virtual tape library system for volumes of data stored in the second cluster;
    comparing results of the querying of the database associated with the first cluster with results of the querying of the database associated with the second cluster;
    generating a list of entries of volumes of data that are to be migrated from the first cluster to the second cluster based on the comparing of the results, wherein the entries of the list are ordered according to predefined conditions; and
    migrating from the first cluster to the second cluster, copies of the volumes of data of the generated ordered list,
    wherein the migrating is performed according to the order of the list,
    wherein volumes of data of the database associated with the second cluster that match predefined user criteria are excluded from the querying of the database associated with the second cluster.

2. The computer-implemented method of claim 1, wherein an extent of concurrent migration of volumes of the generated ordered list is based on an adjustable threshold of a queue, wherein the adjustable threshold of the queue is decreased in response to determining that overhead of the virtual tape library system exceeds a first predetermined threshold, wherein the adjustable threshold of the queue is increased in response to determining that the overhead of the virtual tape library system is below a second predetermined threshold.

3. The computer-implemented method of claim 1, comprising:
    generating a report of progress of the migration, wherein the report is based on monitoring of the migration, wherein the report includes a notice detailing an adjustment to an adjustable threshold of a queue; and
    outputting the report of the progress of the migration.

4. The computer-implemented method of claim 1, wherein generating the ordered list of entries includes:
    determining whether a given volume that is to be migrated from the first cluster to the second cluster would, as a result of queuing the entire given volume in a queue, cause overhead of the virtual tape library system to exceed a first predetermined threshold; and
    in response to a determination that, as a result of queuing the entire given volume in the queue, the overhead of the virtual tape library system would exceed the first predetermined threshold, logically partitioning the given volume into two or more portions, and creating a different entry in the list for each of the portions of the given volume.

5. The computer-implemented method of claim 1, comprising: logically replacing the first cluster with the second cluster in the virtual tape library system in response to migrating the copies of the volumes from the first cluster to the second cluster.

6. The computer-implemented method of claim 1, comprising: logically decoupling the first cluster from the virtual tape library system in response to migrating the copies of the volumes from the first cluster to the second cluster.

7. The computer-implemented method of claim 1, wherein querying the database associated with the first cluster of the virtual tape library system and/or querying the database associated with the second cluster of the virtual tape library system includes performing more than one querying of the respective database, wherein each querying includes a different search criterion.

8. A computer program product for monitored migration of copies of volumes of data between clusters of a virtual tape library system, the computer program product comprising a computer readable storage medium having program instructions embodied therewith, the program instructions readable and/or executable by a controller to cause the controller to:
    query, by the controller, a database associated with a first cluster of a virtual tape library system for volumes of data stored in the first cluster;
    query, by the controller, a second database associated with a second cluster of the virtual tape library system for volumes of data stored in the second cluster;
    compare, by the controller, results of the querying of the database associated with the first cluster with results of the querying of the database associated with the second cluster;
    generate, by the controller, a list of entries of volumes of data that are to be migrated from the first cluster to the second cluster based on the comparing of the results, wherein the entries of the list are ordered according to predefined conditions;
    migrate, by the controller, from the first cluster to the second cluster, copies of the volumes of data of the generated ordered list,
    wherein an extent of concurrent migration of volumes of the generated ordered list is based on an adjustable threshold of a queue; and
    logically replace, by the controller, the first cluster with the second cluster in the virtual tape library system in response to migrating the copies of the volumes from the first cluster to the second cluster.

9. The computer program product of claim 8, wherein volumes of data of the database associated with the second cluster that match predefined user criteria are excluded from the querying of the database associated with the second cluster.

10. The computer program product of claim 8, the program instructions readable and/or executable by the controller to cause the controller to:
    generate, by the controller, a report of progress of the migration, wherein the report is based on monitoring of the migration, wherein the report includes a notice detailing an adjustment to the adjustable threshold of the queue; and
    output, by the controller, the report of the progress of the migration.

11. The computer program product of claim 8, wherein generating the ordered list of entries includes:
- determining whether a given volume that is to be migrated from the first cluster to the second cluster would, as a result of queuing the entire given volume in the queue, cause overhead of the virtual tape library system to exceed a first predetermined threshold; and
- in response to a determination that, as a result of queuing the entire given volume in the queue, the overhead of the virtual tape library system would exceed the first predetermined threshold, logically partitioning the given volume into two or more portions, and creating a different entry in the list for each of the portions of the given volume.

12. The computer program product of claim 8, wherein the migrating is performed according to the order of the list, wherein the adjustable threshold of the queue is decreased in response to determining that overhead of the virtual tape library system exceeds a first predetermined threshold, wherein the adjustable threshold of the queue is increased in response to determining that the overhead of the virtual tape library system is below a second predetermined threshold.

13. The computer program product of claim 8, the program instructions readable and/or executable by the controller to cause the controller to: logically decouple, by the controller, the first cluster from the virtual tape library system in response to migrating the copies of the volumes from the first cluster to the second cluster.

14. The computer program product of claim 8, wherein querying the database associated with the first cluster of the virtual tape library system and/or querying the database associated with the second cluster of the virtual tape library system includes performing more than one querying of the respective database, wherein each querying includes a different search criterion.

15. A system, comprising:
- a processor; and
- logic integrated with the processor, executable by the processor, or integrated with and executable by the processor, the logic being configured to:
- query a database associated with a first cluster of a virtual tape library system for volumes of data stored in the first cluster;
- query a second database associated with a second cluster of the virtual tape library system for volumes of data stored in the second cluster,
- wherein the database associated with the first cluster is a different database than the second database;
- compare results of the querying of the database associated with the first cluster with results of the querying of the database associated with the second cluster;
- generate a list of entries of volumes of data that are to be migrated from the first cluster to the second cluster based on the comparing of the results, wherein the entries of the list are ordered according to predefined conditions; and
- migrate from the first cluster to the second cluster, copies of the volumes of data of the generated ordered list,
- wherein the migrating is performed according to the order of the list,
- wherein an extent of concurrent migration of volumes of the generated ordered list is based on an adjustable threshold of a queue,
- wherein the adjustable threshold of the queue is decreased in response to determining that overhead of the virtual tape library system exceeds a first predetermined threshold,
- wherein the adjustable threshold of the queue is increased in response to determining that the overhead of the virtual tape library system is below a second predetermined threshold,
- wherein the first predetermined threshold and the second predetermined threshold exist simultaneously.

16. The system of claim 15, wherein volumes of data of the database associated with the second cluster that match predefined user criteria are excluded from the querying of the database associated with the second cluster.

17. The system of claim 15, the logic being further configured to:
- generate a report of progress of the migration, wherein the report is based on monitoring of the migration, wherein the report includes a notice detailing an adjustment to the adjustable threshold of the queue; and
- output the report of the progress of the migration.

18. The system of claim 15, wherein generating the ordered list of entries includes:
- determining whether a given volume that is to be migrated from the first cluster to the second cluster would, as a result of queuing the entire given volume in the queue, cause the overhead of the virtual tape library system to exceed the first predetermined threshold; and
- in response to a determination that, as a result of queuing the entire given volume in the queue, the overhead of the virtual tape library system would exceed the first predetermined threshold, logically partitioning the given volume into two or more portions, and creating a different entry in the list for each of the portions of the given volume.

19. The system of claim 15, the logic being further configured to: logically replace the first cluster with the second cluster in the virtual tape library system in response to migrating the copies of the volumes from the first cluster to the second cluster.

20. The system of claim 15, the logic being further configured to: logically decouple the first cluster from the virtual tape library system in response to migrating the copies of the volumes from the first cluster to the second cluster.

* * * * *